(12) United States Patent
Zhou et al.

(10) Patent No.: US 8,856,235 B2
(45) Date of Patent: *Oct. 7, 2014

(54) INFERRING USER PROFILE ATTRIBUTES FROM SOCIAL INFORMATION

(71) Applicant: Facebook, Inc., Menlo Park, CA (US)

(72) Inventors: Ding Zhou, Palo Alto, CA (US); Pierre Moreels, San Jose, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/945,615

(22) Filed: Jul. 18, 2013

(65) Prior Publication Data

US 2013/0304658 A1   Nov. 14, 2013

Related U.S. Application Data

(63) Continuation of application No. 12/916,322, filed on Oct. 29, 2010, now Pat. No. 8,495,143.

(51) Int. Cl.
*G06F 15/16* (2006.01)
*G06Q 10/10* (2012.01)
*G06Q 50/00* (2012.01)
*G06Q 30/02* (2012.01)

(52) U.S. Cl.
CPC ............... *G06Q 10/10* (2013.01); *G06Q 50/01* (2013.01); *G06Q 30/02* (2013.01)
USPC ........................ 709/204; 709/203; 705/14.66

(58) Field of Classification Search
USPC ................................ 709/203, 204; 705/14.66
See application file for complete search history.

(56) References Cited

U.S. PATENT DOCUMENTS

| | | | |
|---|---|---|---|
| 7,827,208 B2 | 11/2010 | Bosworth et al. | |
| 8,171,128 B2 | 5/2012 | Zuckerberg et al. | |
| 8,495,143 B2 * | 7/2013 | Zhou et al. | 709/204 |
| 2010/0063993 A1 * | 3/2010 | Higgins et al. | 709/203 |
| 2010/0076850 A1 * | 3/2010 | Parekh et al. | 705/14.66 |
| 2010/0082360 A1 * | 4/2010 | Chien et al. | 705/1 |
| 2010/0203876 A1 * | 8/2010 | Krishnaswamy | 455/418 |
| 2012/0166532 A1 | 6/2012 | Juan et al. | |
| 2012/0331063 A1 | 12/2012 | Rajaram | |
| 2013/0254283 A1 | 9/2013 | Garcia-Martinez et al. | |

OTHER PUBLICATIONS

U.S. Appl. No. 13/584,625, filed Aug. 13, 2012, Inventors: Baldwin et al. [copy not enclosed.].

(Continued)

*Primary Examiner* — Yves Dalencourt
(74) *Attorney, Agent, or Firm* — Fenwick & West LLP

(57) ABSTRACT

User profile information for a user of a social networking system is inferred based on information about user profile of the user's connections in the social networking system. The inferred user profile attributes may include age, gender, education, affiliations, location, and the like. To infer a value of a user profile attribute, the system may determine an aggregate value based on the attributes of the user's connections. A confidence score may also be associated with the inferred attribute value. The set of connections analyzed to infer a user profile attribute may depend on the attribute, the types of connections, and the interactions between the user and the connections. The inferred attribute values may be used to update the user's profile and to determine information relevant to the user to be presented to the user (e.g., targeting advertisements to the user based on the user's inferred attributes).

23 Claims, 3 Drawing Sheets

(56) References Cited

OTHER PUBLICATIONS

U.S. Appl. No. 13/627,774, filed Sep. 26, 2012, Inventors: Baldwin et al. [copy not enclosed.].

Mislove, A. et al., "You Are Who You Know: Inferring User Profiles in Online Social Networks," *Proceedings of the Conference on Web Search and Data Mining '10*, Feb. 4-6, 2010, pp. 251-260, New York, New York, USA.

\* cited by examiner

INFERRING USER PROFILE ATTRIBUTES FROM SOCIAL INFORMATION

CROSS REFERENCE TO RELATED APPLICATIONS

This application is a continuation of U.S. application Ser. No. 12/916,322, filed Oct. 29, 2010, which is incorporated by reference in its entirety.

BACKGROUND

This invention relates to social networking, and in particular to inferring user profile information in a social networking system from social information about a user.

Social networking systems store information about users and about the relationships between users. Social networking systems allow users to specify information describing them in their user profile, for example age, gender, and marital status of the user. Social networking systems further allow users to specify other users that they want to connect to via the social networking system. Users connected to a user in the social networking system are referred to as the connections of the user or friends of the user. Users frequently interact with other users via the social networking system, for example, by sending messages, via wall posts, by commenting on photos, or sending recommendations to other users. Social networking systems collect information describing actions associated with users as well as interactions between users over time.

User profile information for a user is often not complete and may not even be completely accurate. Users may not be interested in providing the information, they may forget to provide the information, or they may provide incorrect information. Users may provide incorrect information inadvertently, for example by making a mistake in entering the information. Sometimes users deliberately provide incorrect information; for example, a user may provide incorrect age in the user profile. Users may also forget to update their information when it changes. For example, a user may move to a new location and forget to update the user's geographical location, or a user may change jobs but forget to update their workplace description in the user profile. Sometimes, users may not have time to provide some user profile information accurately. For example, a user may not have time to think and articulate the user's likes and interests. Similarly, a user may have attended multiple educational organizations and may not enter all the details of the user's educational history.

Social networking systems can mandate that their users specify certain information. However, forcing users to provide user profile attributes may discourage users from becoming members of the social network. Moreover, mandating a particular user profile attribute does not guarantee that the user will provide accurate information.

SUMMARY

Embodiments of the invention infer user profile information for a user of a social networking system based on social information about the user. In one embodiment, information describing users of the social networking system that are connected to the user is received. An aggregate value based on attributes of the user's connections is used to determine a user profile attribute for the user. One or more attribute values for a user profile may thus be inferred and then stored in connection with the user profile. The inferred attribute values may be used to determine information relevant to the user, which is then directed to the user. For example, an advertisement relevant to a user can be determined by matching information describing the advertisement with the inferred attributes of the user profile of the user. The advertisement is then presented to the user. In this way, a social networking system can infer information about a user from that user's connections (e.g., friends) and then target content to the user using the inferred information.

A user's attributes may be inferred based on the attribute values of the user's connections, such as the mean, median, or mode of the attribute values of those connections. The aggregate value of these attributes may be a weighted aggregate value. In an embodiment, the weight assigned to information associated with a user is determined based on factors including the frequency of interactions between the user and the connections, the length of time interval during which the user and the connection interacted, and a type of the connection. Information describing connections of the user may also be combined with other types of information to infer attributes. For example, the user's location may be inferred based on the locations of the connections of the user along with information derived from sessions created by the user, for example, an Internet protocol (IP) address of client devices used to create the session.

The set of connections analyzed for inferring an attribute value may be a subset of the connections of the user, for example, a subset of connections that interact with the user frequently or a subset of connections that are within a threshold age difference with the user. The subset of connections may be determined based on the type of attribute being inferred or the type of connection. For example, the subset of connections used to infer a language of the user may include connections indicated as family, whereas the subset of connections used to infer the education of a user may exclude the connections indicated as family. Cluster analysis of the connections of the user based on an attribute value may be performed to determine a subset of connections relevant for inferring the user profile attribute.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A social networking system offers its members the ability to communicate and interact with other users of the social networking system. Users join the social networking system and add connections to a number of other users to whom they desire to be connected. Users of social networking system can provide information describing them which is stored as user profiles. For example, a user can provide age, gender, geographical location, education history, employment history and the like describing them. The information provided by users may be used by the social networking system to direct information to the user. For example, the social networking system may recommend social groups, events, and potential friends to a user. The social networking system may also use the information describing a user to direct advertisements to the user, ensuring that only relevant ads are directed to the user. This provides value to the advertisers as well as users since advertisers do not waste their resources by presenting advertisements to users that are not interested in their advertisements and users do not have to view advertisements that are not relevant to them.

However, the user profile information provided by a user may not always be complete or accurate. Users may be too busy to provide information, the information may be outdated, or the user may be deliberately provided incorrect information. Embodiments of the invention infer values for user profile attributes based on other information available in the social networking system associated with the user including information describing connections of the user, interactions of the user with other users, actions of the user, and the information explicitly provided by the user. The inferred attributes of a user are stored as part of the user profile of the user.

Figure 1:
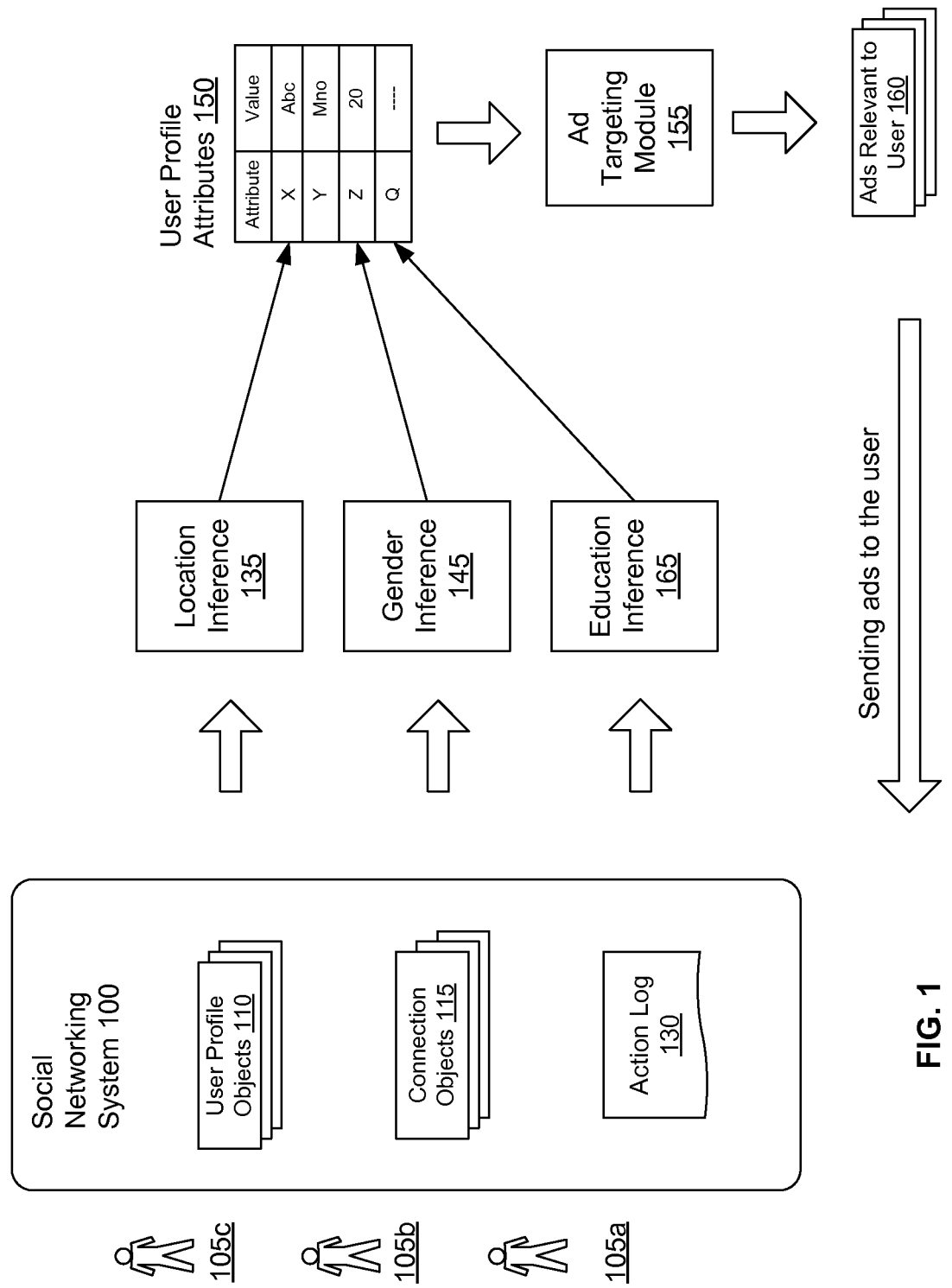
FIG. 1 is a diagram of a process for inferring user profile attributes from social network information and using the inferred attributes to target information to the user, in accordance with an embodiment of the invention.

FIG. 1 is a diagram of the overall process for inferring information for a user 105 of a social networking system 100, in accordance with an embodiment of the invention. The users 105a, 105b, and 105c interact with the social networking system 100. (A letter after a reference numeral, such as "105a," indicates that the text refers specifically to the element having that particular reference numeral, while a reference numeral in the text without a following letter, such as "105," refers to any or all of the elements in the figures bearing that reference numeral.)

The social networking system 100 stores various objects comprising information related to users, connections between users, or other entities represented in the social networking system 100. These objects include user profile objects 110 that store information describing the users of the social networking system 100 and connections objects 115 that store information describing connections between users of the social networking system 100. Users of the social networking system 100 may take actions using the social networking system 100 that are associated with one or more objects. Information describing these actions is stored in the action log 130.

The various objects stored in the social networking system 100 and the action logs 130 act as a source of information for various modules to infer attributes describing a given user. For example, the location inference module 135 infers the geographical location of the user, the gender inference module 145 infers the gender of the user, and the education inference module 165 infers the education of the user.

The inferred values of the user profile attributes along with the attribute values provided by the user can be used to direct specific types of information to the user. For example, an ad targeting module 155 that targets specific ads to a user can use the user profile attributes 150 to determine relevant ads 160 for a user. These relevant ads are sent to the user 105 of the social networking system 100. In other embodiments, other types of information can be directed to the user based on inferred values of attributes, for example, recommendations of potential connections for the user, events or groups relevant to the user, information pertaining to dating or establishing new friendship and the like.

System Architecture

Figure 2:
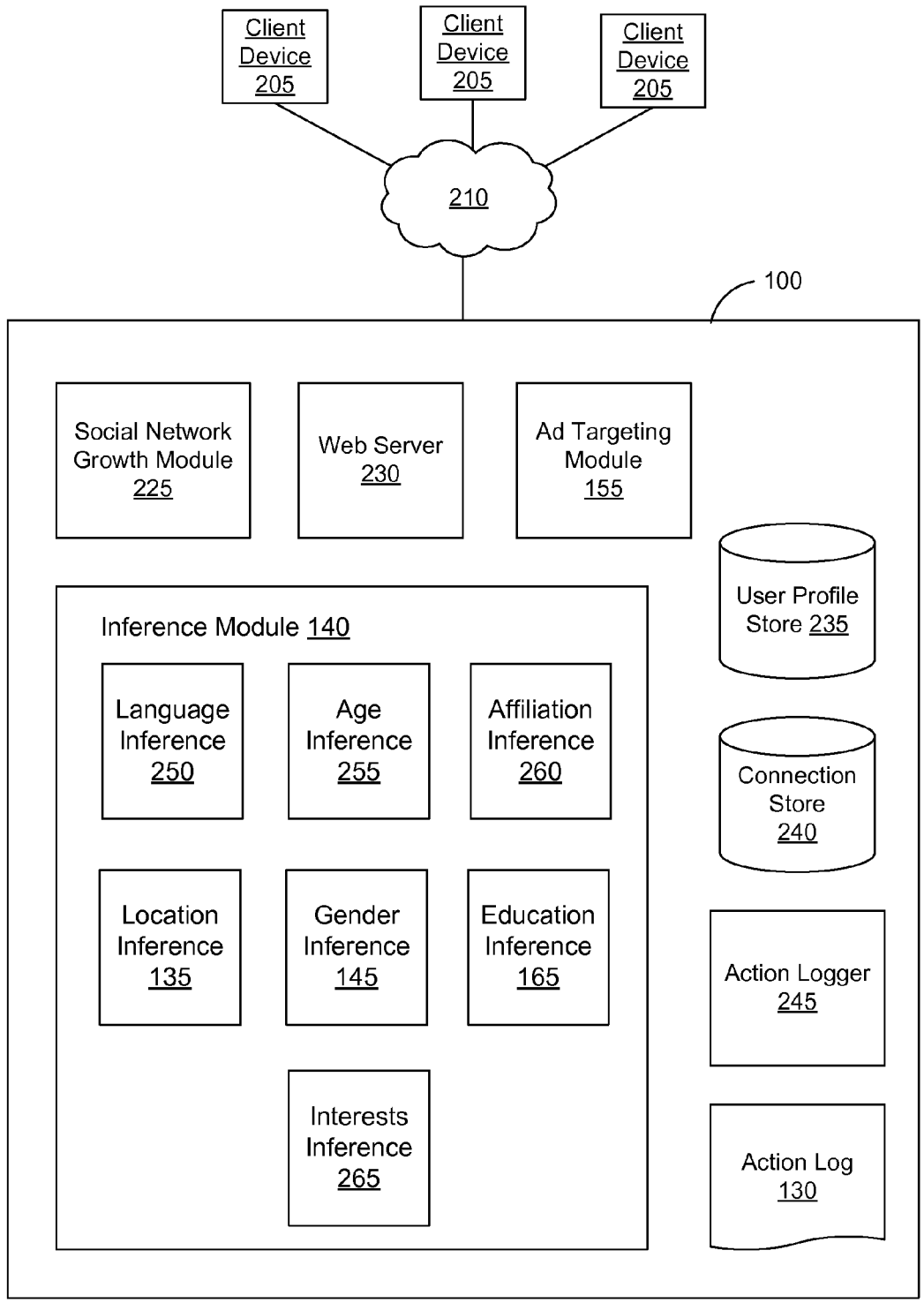
FIG. 2 is a high level block diagram of a system environment suitable for inferring user profile attributes in a social networking system, in accordance with an embodiment of the invention.

FIG. 2 is a high level block diagram illustrating a system environment suitable for inferring information describing users based on social networking information, in accordance with an embodiment of the invention. The system environment comprises one or more client devices 205, the social networking system 100, and a network 210. In alternative configurations, different and/or additional modules can be included in the system.

The client devices 205 comprise one or more computing devices that can receive user input and can transmit and receive data via the network 210. In one embodiment, the client device 205 is a conventional computer system executing, for example, a Microsoft Windows-compatible operating system (OS), Apple OS X, and/or a Linux distribution. In another embodiment, the client device 205 can be a device having computer functionality, such as a personal digital assistant (PDA), mobile telephone, smart-phone, etc. The client device 205 is configured to communicate via network 210. The client device 205 can execute an application, for example, a browser application that allows a user of the client device 205 to interact with the social networking system 100.

In one embodiment, the network 210 uses standard communications technologies and/or protocols. Thus, the network 210 can include links using technologies such as Ethernet, 802.11, worldwide interoperability for microwave access (WiMAX), 3G, digital subscriber line (DSL), etc. Similarly, the networking protocols used on the network 210 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 210 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), Internet Protocol security (IPsec), etc.

FIG. 2 contains a block diagram of the social networking system 100. The social networking system 100 includes a web server 230, an action logger 245, a user profile store 235, an action log 130, an ad targeting module 155, a social network growth module 225, an inference module 140 and a connection store 240. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The web server 230 links the social networking system 100 via the network 210 to one or more client devices 205; the web server 230 serves web pages, as well as other web-related content, such as Java, Flash, XML, and so forth. The web server 230 may provide the functionality of receiving and routing messages between the social networking system 100 and the client devices 205, for example, instant messages, queued messages (e.g., email), text and SMS (short message service) messages, or messages sent using any other suitable messaging technique. The user can send a request to the web server 230 to upload information, for example, images or videos that are stored in the user profile store.

The action logger 245 is capable of receiving communications from the web server 230 about user actions on and/or off the social networking system 100. The action logger 245 populates the action log 130 with information about user actions to track them. Such actions may include, for example, adding a connection to the other user, sending a message to the other user, uploading an image, reading a message from the other user, viewing content associated with the other user, attending an event posted by another user, among others. In addition, a number of actions described below in connection with other objects are directed at particular users, so these actions are associated with those users as well.

The user account information and other related information for a user is stored in the user profile store 235. The user profile information stored in user profile store 235 describes the users of the social networking system 100, including biographic, demographic, and other types of descriptive information, such as work experience, educational history, gender, hobbies or preferences, location, and the like. The user profile may also store other information provided by the user, for example, images or videos. In certain embodiments, images of users may be tagged with the identification information of the appropriate users displayed in an image.

The connection store 240 stores the information describing the connections between users. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

The social network growth module 225 performs actions that promote growth of the social networking system 100 by increasing the membership of the social networking system 100. The social network growth module 225 also attempts to increase the number of connections between the users of the social networking system 100 as well as overall activities of the users of the social networking system 100. For example, the social network growth module 225 can encourage users to interact more frequently with other users, or participate in activities, for example, become members of groups on the social networking system 100 or run applications provided on the social networking system 100. In an embodiment, the social network growth module 225 can suggest a user to other users that may be potential friends of the user, encouraging them to create a connection with the user. The social network growth module 225 may recommend social groups for membership to a or inform a user of events that may be relevant to the user.

The ad targeting module 155 determines the users to which advertisements provided by vendors are targeted. In some embodiments, the ad targeting module 155 uses information stored in the user profile store 235 to determine the types of ads that a user may be interested in. For example, the ad targeting module 155 may analyze the interests of the user, the age, gender and other attributes of a user to determine which ads the user may be interested in. The advertisers may provide information describing the profiles of users that are likely to be interested in particular types of advertisements. Alternatively, the advertisers may provide information describing the types of products being promoted in the advertisement and the ad targeting module 155 determines the type of users that the advertisement is presented to. For example, advertisements of articles products typically used by men may be directed towards a user who's inferred or user specified gender is male.

The inference module 140 infers information describing a user based on other information associated with the user. The inference module 140 comprises sub-modules that infer specific types of information for a user including language inference module 250, age inference module 255, affiliation inference module 260, location inference module 135, gender inference module 145, interest inference module 265, and education inference module 165 among other sub-modules. There can be other sub-modules of the inference module 140 that infer other types of information for users. The inferred user attributes 150 are stored by the inference module 140 in the user profile store 235.

The inferred user attributes 150 can determine a confidence score value for each attribute value inferred. The confidence score indicates a likelihood of the inferred value being accurate based on historical data associated with the attribute value as well as the information used for inferring the attribute value. For example, if the age of a user is inferred using a large number of friends of the user that have age correlated with the age value inferred for the user, the confidence score for the inferred value is high. On the other hand, if the number of friends used for inferring the attribute value is small, the confidence score is determined to be low.

The location inference module 135 infers geographical location of a user of the social networking system 100. The location inference module 135 uses locations of the connections of a user along with other information to infer location of a user. In an embodiment, the inferred location comprises one or more of a country, a region, or a city. The confidence score of a country inferred for a user is higher than the confidence score of a region inferred for the user, which in turn is higher than the confidence score of a city inferred for the user.

The location inference module 135 determines the various locations of the connections of the user. The location inference module 135 may infer location of a user based on a subset of the connections of the user that interact frequently with the user. Interactions between users and their connection include exchanges of messages, wall posts, comments made on photos or videos, recommendations made to other users, and the like. Users that have not interacted with the user for a long time can be excluded since there is a possibility that they are old connections of the user and the user may have moved to a different location. The locations of the subset of the connections of the user are analyzed to determine the number of connections at each location. The location of the user is inferred as the location with the highest number of connections of the user that frequently interact with the user. For example, if a large number of users that the user frequently interacts with belong to a city, the user may be inferred to be residing in that city. If the users that the use interacts with belong to different cities all belonging to the same country, that country can be inferred as the user's country.

The location of a user can be determined based on other factors, for example, based on the internet protocol (IP) address associated with sessions created by the user. Various communication protocols provide IP address of a client device used to establish communication with a server in the social networking system 100. The IP address of the client device can be mapped to geographical location of the machines using the IP address. As a result, the geographical location of the client device can be determined. Some client devices are equipped with global positioning systems (GPS) and the location of the client device as provided by GPS may be available to the social networking system 100. The location of a client device 205 that is equipped with wireless communication functionality may be obtained from the cell towers that the client device interacts with. In an embodiment, the user executes a check-in command via a mobile device to indicate the user's presence in a location. For example, a user that enters a restaurant or a bar can execute a check-in command using a mobile device, for example, a cellular phone. The check-in command indicates to the social networking system that the user is present at a location. A GPS associated with the users mobile device can be used to determine the location of the user. A user who executes a check-in command from a particular location for a period of time greater than a threshold value can be inferred to have that location. For example, a user checking in from locations within a city for several months can be assumed to be located in that city. On the other hand, if the user checks in from a city for a few days and then start checking in from another city can be assumed to have travelled to the first city but not necessarily located in that city. Another factor used to infer the location of a user is the locale of the user used to interact with the social networking system 100. For example, a user using French locale is likely to be located in France (subject to information inferred from other sources). The location of a user can also be provided by the user in the user profile.

In an embodiment, conflicts in locations obtained from various sources are resolved by attaching a confidence score with the source, for example, the location obtained via GPS may be considered more reliable compared to location specified by the user. The confidence score of the inferred values from various sources is compared to determine a final inferred location of the user as well as the confidence score of the inferred location.

The language inference module 250 infers language of a user. A user can use multiple languages. Various factors considered for inferring language of a user include, the language of the connections of the user or the languages used by the user for interacting with the connections via messages, wall posts, status etc. and the language of content viewed by the user. In some embodiments, the location of the user is considered a factor in inferring the language of the user. Locations are mapped to languages spoken by users in those locations. Other related factors for inferring languages of a user include the length of time that the user has been associated with a location. For example, if the location of a user is identified as Spain and the user has been identified with the location for several years, the language inference module 250 infers that the user knows Spanish.

In an embodiment, the language of a user is inferred by analyzing a subset of the connections of the user that interact frequently with the user. The information associated with the connections may be weighted to infer a confidence score for the language of the user. If a confidence score for the language inferred exceeds a threshold value, the particular language is assumed to be a language of the user. In an embodiment, the weight assigned to a connection for inferring the language of the user may be based on a type of connection, for example, a connection based on family relationship is assigned higher weight compared to a non-family relationship. This is based on the assumption that if family members of a user use a language, the chances of the user also using the same language are high.

In an embodiment, the various factors used to infer a language of a user may be used to determine a fluency score with the language. For example, a user with large number of interactions or very frequent interactions with a large number of connections in a given language is assigned a fluency score indicating high fluency. On the other hand a user with only occasional interactions with the connections in a particular language and with very few connections using a language may be assigned a fluency score indicative of low fluency in the language.

The age inference module 255 infers age of a user based on factors including the age of connections of the user. In an embodiment the frequency of different age value of the connections of the user is analyzed. The age value with the highest frequency is inferred to be the age of the user. This inference is based on an assumption that a user is likely to have a large number of connections with users belonging to the user's age group. The age group of a person is the set of users that have an age within a threshold value of the age of the user, for example, within a couple of years of age difference compared to the user.

In an embodiment, cluster analysis of the connections of the user is performed based on their age values. Clusters of users are identified that correspond to different age groups. The largest cluster of connections of the user based on age is identified. The age of the user is inferred based on an aggregate value derived from the ages of this cluster of connections, for example, the mean of the ages of these connections, or mode, or median value. In an embodiment, the connections of the user considered for inferring age of the user exclude connections indicated as family of the user since ages of family members have a weak correlation with the age of the user. Other factors considered in inferring age of a user include the education of the user and the work history of the user if available. For example, if the user is known to have received a Master's degree in a particular discipline, the typical age of people when they finish the corresponding program can be used to infer the user's age or to confirm the age determined from other sources.

The education inference module 165 infers education of the user. The education of a user comprises various educational organizations attended by the user, the programs attended in the educational organizations, and the degrees obtained from the educational organizations. One of the factors considered for inferring education of the user is the education of the connections of the user. Another factor considered in inferring education of a user is information describing membership of the user in college networks in the social networking system. In an embodiment, a subset of the connections of the user from the age group of the user is analyzed for inferring education of the user. If a significant percentage (above a threshold value) of the connections from the subset are known to have attended a particular educational organization, for example, a University or College, the user is likely to have attended the same educational organization. The particular degrees obtained from the educational organization by the subset of connections is analyzed to infer degrees that may have been obtained by a user. For example, if a significant percentage of the subset of connections have obtained a particular law degree from a particular law school, the user is likely to have obtained law degree from that law school. The number of connections of the user with the matching educational organization or degree and the frequency of interactions of the user with these connections are used to determine a confidence score of the inference.

The user may be inferred to have attended multiple educational organization and multiple degrees from one or more educational organization. These inferred values are stored as a list associated with the user profile along with the corresponding confidence score for each inferred value. A potential date of graduation for the user when the user graduated from an educational program can be inferred. A time period can be inferred during which the user was inferred to have studied in an educational organization. In an embodiment, the inferred educational organizations and degrees are analyzed for potential conflicts. For example, if presence of the user is inferred in two educational organizations which are geographically apart and the time of presence is inferred to be the same year(s), the inferred information is determined to conflict with each other since the same user cannot be present in two geographically apart locations at the same time. In case of conflicts, a value that is associated with a higher confidence score may be selected.

The affiliation inference module 260 infers affiliations of the user with various organizations including social organizations, clubs etc. The inference of affiliations with organizations is similar to inference of educational organizations attended by the user in the past. The affiliation inference module 260 also infers the workplace of a user. For example, if several connections of the user that interact frequently with the user have a particular workplace, the user is likely to have the same workplace. Other factors considered for inferring workplace of a user include work experience listed by the user. Another factor considered in inferring workplace for user includes location of the client devices used by the user. A geographical map can be used to determine location of the client device used by the user for connecting to the social networking system. If a significant number of sessions are created by the user over a period of time greater than a threshold value, and the location of the client device maps to a particular work place, the user may be inferred to work at that work place. In an embodiment, the time period during which the sessions are created is analyzed to determine if the sessions were created on weekdays and at work hours or hours close to work hours, for example, during lunch time, evenings etc.

The gender inference module 145 infers the gender of the user. A factor considered in inferring the gender of the user includes the gender of the connections of the user. A subset of the connections that belong to the age group of the user may be considered for inferring the gender of the user. This subset of connections is considered based on the assumption that most of the friends of the user in the same age group as the user are likely to have the gender of the user. The connections of the user indicated as family may be excluded from the subset of connections considered for inferring the age of the user since genders of family members of a user are assumed to have low correlation with the gender of the user.

A factor used to infer gender of a user is information based on images tagging the user. If an image tags a significant number of users, and a significant percentage of users in the image belong to a particular gender, the user is assumed to have the same gender. For example, if the known gender value for all users appearing in an image happens to be female, the gender of the user can be inferred to be female with a high likelihood. The number of users present in the image should be significantly large (above a threshold value) to allow inferring gender based on images with a high confidence value. The confidence score is also based on the number of images that contribute towards the inference, for example, if a large number of images indicate that the gender of a user is female, the confidence score is determined to be high.

Other factors used to infer gender of a user include information regarding types of products used or purchased by the user, if the information is available in the social networking system. For example, a user making regular purchases of nail polish, lip stick or other make up articles typically used by women can be inferred to have a female gender with high likelihood.

Another factor used for inferring gender of a user is the name of the user. Typically, the first name of a user can be used to infer gender of the user based on historical patterns of name and gender correlation. For example, the name "Mary" can be used to infer female gender whereas the name "John" of a user can be used to infer male gender. A dictionary mapping the names of the users with genders based on historical patterns can be used for analyzing gender of users. In an embodiment, the dictionary lookup of the name can be used to confirm a gender value inferred from other sources including the user profile of connections of the user. If the inferred gender is consistent with the gender inferred using the dictionary lookup based on the name of the user, the confidence score of the inferred value is determined to be high.

Another factor used to infer gender of a user includes interests of the user. Typical biases of users of a particular gender towards particular interests are analyzed based on historical data obtained from action log 130. For example, correlations with particular types of books, movies, television programs may be used to infer gender of users. For example, users with a particular gender may be more likely to be interested in romantic novels as compared to action novels.

In an embodiment, specific information provided by connections of a user can be used to infer the gender of the user. For example, if the gender of a connection of the user is determined to be male, and the connection has marked the user as the connection's spouse, the gender of the user may be inferred to be female with a high likelihood. Similarly, if a connection of the user has marked the user as the connection's father, the gender of the user can be inferred to be male.

Gender value for a user based on various factors is analyzed to determine the inferred gender of the user, for example, based on confidence score associated with the values determined from each source. In some embodiments, gender value inferred from some of the sources of information is confirmed based on a value inferred from other sources. The confidence score of the inferred value is determined to be higher if the inferred value is consistent with the information derived from other sources.

The interest inference module 265 infers interests and likes or preferences of a user. The interests of a user are inferred from interactions of the user with the connections of the user. These interactions include messages sent to other users, wall posts, status of the user posted on the social networking system, recommendations made to other user, and the like. The interactions of the user with connections of a user are analyzed for keywords indicative of particular topics, for example, topics related to sports, shopping, movies etc. The sentiment of the messages can be analyzed to identify keywords indicating "dislike," "hate," "love," or similar sentiment associated with the topics. The sentiment analysis indicates whether the user mentioned the topic because the user likes it or because the user dislikes it. The number of instances that mention a particular topic or the degree of sentiment associated with the topic is used to determine a confidence score for the inferred interest. Other factors analyzed to infer interests of a user include types of content retrieved by the user and the types of searches performed by the user, and categories of web pages or groups or events that the user is a fan of as indicated on the social networking system.

Figure 3:
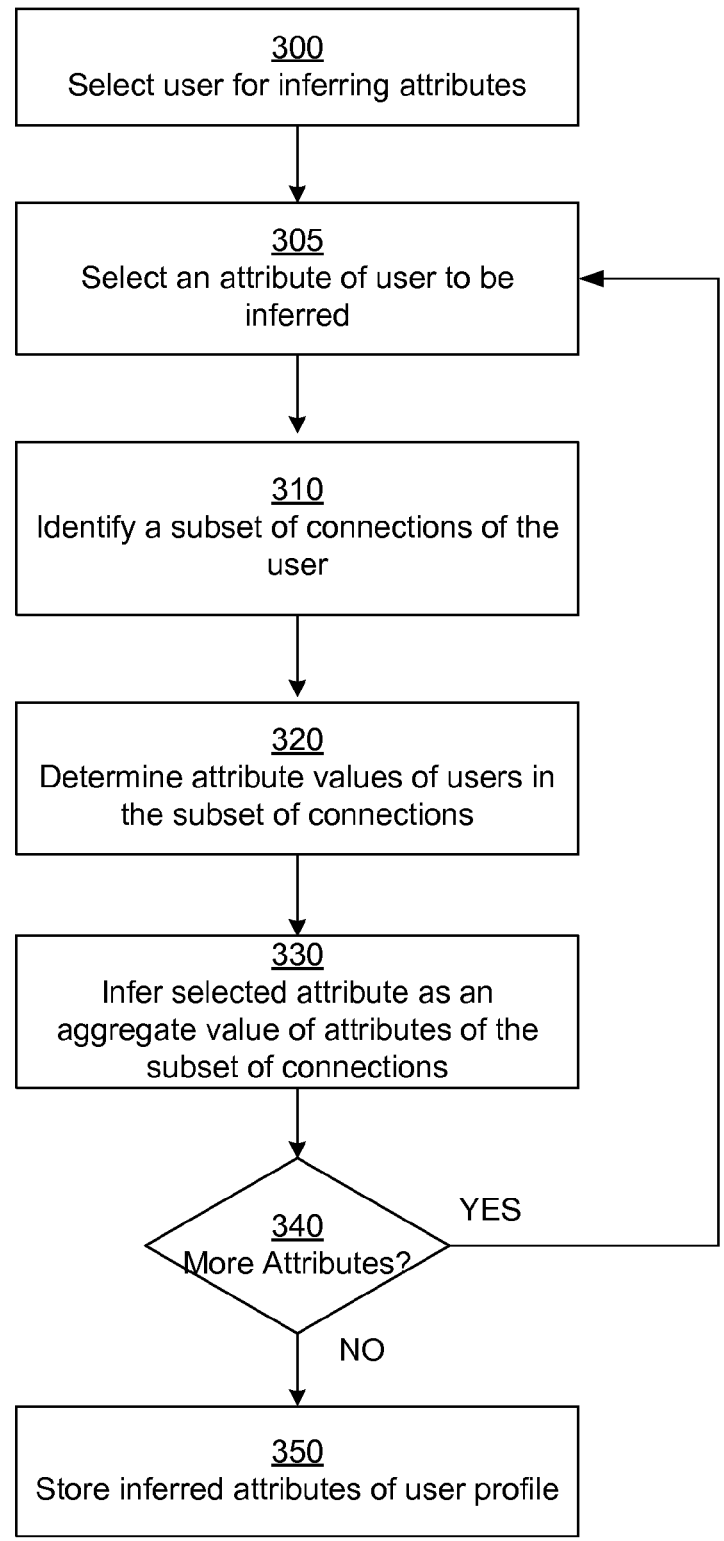
FIG. 3 is a flowchart of a process for inferring user attributes from social network information, in accordance with one embodiment of the invention.

FIG. 3 is a flowchart of a process for inferring user attributes from social network information, in accordance with one embodiment of the invention. The inference module 140 selects 300 a user for whom attributes need to be inferred. The inference module 140 can analyze all users in a round robin fashion to determine if there are attributes to be inferred for each user. Alternatively, the inference module 140 can prioritize certain users for analysis, for example, users that have provided values for very few attributes in their user profiles.

The inference module 140 selects 305 an attribute of a user for inferring the attribute's value. The inference module 140 selects 305 attributes for which the user has not provided any value. The inference module 140 may also select 305 attributes for analysis for which users are known to provide incorrect values. These attributes can be determined by statistical analysis of historical data, for example, by inferring attribute values for a large number of users and comparing the user provided values with inferred attribute values for which the confidence score is high. For example, some users may provide incorrect values for attributes including age or relationship. Sometimes, user provided values may be incorrect because the user forgot to update the value, for example, geographical location or workplace of the user.

The inference module 140 identifies 310 a subset of connections of the user to be used for inferring an attribute value for the user. The subset of the connections of the user can be selected based on closeness of the connection or on the type of the connection. For example, the subset of the connections may comprise users that are determined to be close to the user, for example, based on frequency of interactions between the connection and the user, the length of time interval during which the connections and the user have interacted with each other.

The selection of the subset of connections for inferring a user attribute value can depend on the attribute itself. For example, the subset of connections used for determining age of a user can be different from the subset of connections used for determining the language of the user. The subset of connections may be selected based on a type of connection. The type of a connection can indicate a type of relation between two users such as family, friends, colleagues and the like. For example, the language of a user is likely to be correlated with the language of the user's family and therefore the subset of the connections used to determine language of a user includes connections determined to be part of family of the user. On the other hand, the age of a user is unlikely to be correlated to the age of family members. For example, the age of parents, uncles and aunts of a user is less likely to be correlated with the age of the user. The age of the user is more likely to be correlated to the age of the user's friends in real life. Therefore, for inferring the age of a user, the subset of connections relevant to the age comprises the friends of the user in real life that are not indicated as family. In general, connections of the user for whom the attribute is considered uncorrelated with the attribute value of the user can be excluded from the subset of users used to infer the attribute value.

The relevant attribute values of the users in the subset identified 310 are determined 320. Typically, the values relevant for inference of a particular attribute of the selected user are the values of the same attribute in the subset of the user. For example, gender of a user is inferred using the gender of the subset of connections of the user. Similarly age of a user is inferred based on age of the subset of connections of the user. In some cases, other attributes of the users may be relevant for inferring a particular attribute value. For example, the age of users may be relevant in extracting the education of a user by excluding users that have age significantly different compared to the user. An education of a user is likely to be correlated to the education of friends of the user that are in the same age group as the user. The user may have some friends from a very different age group, for example, family friends. The education of friends from a different age group is less likely to be correlated to the education of the user, and is therefore either excluded from the set of users considered for inferring or weighted less compared to users of the same age group.

The selected attribute is inferred 330 based on the attributes of the subset of connections identified 310, for example, the attribute value can be inferred as an aggregate value of the attributes of the subset of connections identified 310. The selected attribute can be inferred using a voting system based on a histogram. For example, the histogram of attribute values of the connections of the user can be analyzed to select the value with a particular frequency. The aggregate value can be computed using a statistical metric, for example, mean, mode, or median. For example, the University that a user went to can be inferred as the University that the largest number of friends of the user's age group went to. Similarly, the gender of a user can be determined based on the gender value that has the most number of occurrences in the friends of the user. The age of the user can be inferred as an average value of the age of the user's friends belonging to a cluster based on age. Alternatively, the age of the user can be inferred as the median value of the age of the user's friends belonging to a cluster based on age.

In an embodiment, the attribute value can be inferred using a machine learning algorithm. A machine learning model can be trained using training sets of users. In an embodiment, the training set comprises users with particular values or ranges of values of specific attributes. For example, to infer age of a user, the training set comprises users from different ranges of ages. The input variables for the machine learning algorithm include attributes of the user and information describing their connections. For example, to infer the location of a user, the input variables can be histograms based on locations of the connections of the user, user session information, and the like. The trained model can be used to predict attribute values for users. For example, the appropriate information describing a user can be input to the model to predict attributes describing the user.

If the inference module 140 determines 340 that there are more attributes of the user that need to be inferred, the inference module 140 selects 305 the next attribute and performs the above steps 310, 320, and 330 to infer the value of the attribute. The inference module 140 stores the inferred attributes in the user profile store 235. The inferred value of the attribute is tagged to indicate that the value is inferred as compared to a user provided value. If the user provides a value and the inferred value is different from the user provided value, both values may be stored along with a tag indicating the source of the corresponding value. If the confidence score associated with an inferred attribute value is above a threshold value, the inferred value may be preferred over the user provided value for making decisions based on the attribute values, for example, for targeting ads to the user. However, the user provided value may be displayed in a user interface to the users of the social networking system 100 since it is possible that the user does not want to expose the real value of the attribute to the users. In an embodiment, if the confidence score associated with an inferred attribute value is above a threshold value, the user provided value of the attribute may be overwritten by the inferred value.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   maintaining a user profile for each of a plurality of users of a social networking system, each user profile comprising a set of attributes;
   selecting a user from the plurality of users;
   identifying, by a computer, a plurality of interactions between the selected user and one or more of a set of users who are connected to the selected user in the social networking system;
   inferring, by the computer, a value of an attribute of the user profile for the selected user based on one or more of: topic analysis of the one or more identified interactions and sentiment analysis associated with one or more topics identified in the one or more identified interactions;
   determining relevant information for the selected user based on the inferred user profile attribute; and
   sending the relevant information to the selected user.

2. The computer-implemented method of claim 1, wherein inferring the value of the attribute of the user profile for the selected user comprises:
   determining a frequency of occurrence of each value of the attribute for the set of users; and
   selecting a value with a highest frequency of occurrence as the inferred value of the attribute for the selected user.

3. The computer-implemented method of claim 1, wherein inferring the value of the attribute of the user profile for the selected user comprises determining the inferred value of the attribute based on frequency of occurrence of values of the attribute of the set of users.

4. The computer-implemented method of claim 1, wherein inferring the value of the attribute of the user profile for the selected user comprises determining the inferred value of the attribute to be an average value of the attribute of the set of users.

5. The computer-implemented method of claim 1, wherein inferring the value of the attribute of the user profile for the selected user comprises determining the inferred value of the attribute to be a median value of the attribute of the set of users.

6. The computer-implemented method of claim 1, wherein inferring the value of the attribute of the user profile for the selected user comprises determining an aggregate value of the attribute by one or more of: weighting the attribute for each user of the set of users based on a metric describing a closeness of the user with the selected user or weighting the attribute for each user of the set of users based on a type value of a connection between the user and the selected user.

7. The computer-implemented method of claim 1, wherein the set of users is determined to be a subset of users connected to the selected user, the subset determined based on a metric describing a closeness of the user with the selected user.

8. The computer-implemented method of claim 1, wherein the set of users is determined to be a subset of users connected to the selected user, the subset determined based on a type value of a connection between the user and the selected user.

9. The computer-implemented method of claim 1, wherein the set of users connected to the user comprises a cluster of users selected by performing cluster analysis based on the values of the attribute being inferred.

10. The computer-implemented method of claim 1, wherein the set of users connected to the user is determined by excluding users determined to be related to the selected user as a family member.

11. The computer-implemented method of claim 1, wherein the set of users is determined based on the attribute being inferred for the selected user.

12. The computer-implemented method of claim 1, wherein the relevant information for the user comprises an advertisement.

13. The computer-implemented method of claim 1, wherein the relevant information for the user comprises a recommendation to establish a connection with another user in the social networking system.

14. The computer-implemented method of claim 1, wherein the inferred attribute is a location of the selected user, inferred by one or more of: determining a location value with the highest frequency of occurrence in the set of users or determining the location value based on sessions created by the selected user with the social networking system determining the location value based on internet protocol (IP) address of a client device used by the selected user to create sessions with the social networking system.

15. The computer-implemented method of claim 1, wherein the inferred attribute is a gender of the selected user, inferred by one or more of: determining a gender value with the highest frequency of occurrence in the set of users or determining the gender value with the highest frequency of occurrence in a photo in which the selected user is tagged along with other users.

16. The computer-implemented method of claim 1, wherein the inferred attribute is an age of the selected user, and inferring the value of age of the selected user further comprises one or more of: analyzing products associated with the user, performing cluster analysis of users connected to the selected user based on age values of the users connected to the selected user, or performing cluster analysis of users connected to the selected user based on their education.

17. The computer-implemented method of claim 1, further comprising:
   determining whether the inferred value of the attribute of the selected user is consistent with at least one other user profile attribute of the user; and
   responsive to determining that the inferred value is inconsistent with at least one other user profile attribute, rejecting the inferred user profile value.

18. The computer-implemented method of claim 1, wherein the inferred attribute is an age of the selected user, the method further comprising:
   determining an inferred value of age of the selected user;
   determining whether the inferred value of age of the selected user is below a minimum age value as determined based on information describing education of the selected user in the user profile for the selected user; and
   rejecting the inferred age value if the inferred value of age of the selected user is determined to be below the minimum age value.

19. The computer-implemented method of claim 1, wherein the inferred attribute comprises one or more interests of the user.

20. The computer-implemented method of claim 1, wherein the inferred attribute is a language of the user, and the set of users comprise users connected to the selected user determined to be family members of the selected user.

21. A computer program product comprising a non-transitory computer-readable storage medium containing computer program code for:
   maintaining a user profile for each of a plurality of users of a social networking system, each user profile comprising a set of attributes;
   selecting a user from the plurality of users;
   identifying a plurality of interactions between the selected user and one or more of a set of users who are connected to the selected user in the social networking system;
   inferring a value of an attribute of the user profile for the selected user based on one or more of: topic analysis of the one or more identified interactions and sentiment analysis associated with one or more topics identified in the one or more identified interactions;
   determining relevant information for the selected user based on the inferred user profile attribute; and
   sending the relevant information to the selected user.

22. The computer-implemented method of claim 1, further comprising:
   selecting an attribute of the user profile for inferring a value responsive to the attribute missing a user provided value.

23. The computer-implemented method of claim 1, further comprising:
   selecting an attribute of the user profile for inferring a value responsive to the attribute having a user provided value expected to be different from the inferred value.

* * * * *